(12) United States Patent  
Morin et al.

(10) Patent No.: US 9,182,237 B2  
(45) Date of Patent: Nov. 10, 2015

(54) NAVIGATION SYSTEM WITH RAPID GNSS AND INERTIAL INITIALIZATION

(71) Applicant: NovAtel Inc., Calgary (CA)

(72) Inventors: Kristian Morin, Calgary (CA); Michael Bobye, Calgary (CA); Sandra Kennedy, Calgary (CA)

(73) Assignee: NOVATEL INC., Calgary (CA)

( * ) Notice: Subject to any disclaimer, the term of this patent is extended or adjusted under 35 U.S.C. 154(b) by 0 days.

(21) Appl. No.: 14/620,392

(22) Filed: Feb. 12, 2015

(65) Prior Publication Data

US 2015/0268047 A1  Sep. 24, 2015

Related U.S. Application Data

(63) Continuation-in-part of application No. 14/098,620, filed on Dec. 6, 2013.

(51) Int. Cl.
| | |
|---|---|
| *G01S 5/14* | (2006.01) |
| *G01S 19/51* | (2010.01) |
| *G01C 21/16* | (2006.01) |
| *G01S 19/23* | (2010.01) |
| *G01S 5/02* | (2010.01) |
| *H04N 7/18* | (2006.01) |
| *G01S 19/47* | (2010.01) |
| *G01S 19/14* | (2010.01) |
| *G06F 17/13* | (2006.01) |

(52) U.S. Cl.
CPC ............ *G01C 21/165* (2013.01); *G01S 5/0294* (2013.01); *G01S 19/23* (2013.01); *G01S 19/47* (2013.01); *G01S 19/51* (2013.01); *H04N 7/183* (2013.01); *H04N 7/185* (2013.01); *G01C 21/16* (2013.01); *G01S 19/14* (2013.01); *G06F 17/13* (2013.01); *H04N 7/18* (2013.01)

(58) Field of Classification Search
CPC ...... G01C 21/165; G01C 21/16; H04N 7/185; H04N 7/183; H04N 7/18; G06F 17/13; G01S 19/51; G01S 19/23; G01S 5/0294; G01S 19/14; G01S 19/47
USPC ................. 701/300, 468, 469, 472, 479, 480; 703/2; 702/150–153; 348/113, 118; 342/357.73, 357.62, 357.39, 357.34, 342/357.3
See application file for complete search history.

(56) References Cited

U.S. PATENT DOCUMENTS

| 6,172,747 B1 | 1/2001 | Houlberg |
| 6,459,411 B2 | 10/2002 | Frazier et al. |
| 6,721,657 B2 | 4/2004 | Ford et al. |

(Continued)

OTHER PUBLICATIONS

International Search Report and Written Opinion mail date Jan. 8, 2015 for International Application No. PCT/CA2014/051026, filed on Oct. 23, 2013 by NovAtel Inc., 8 pages.

*Primary Examiner* — Russell Frejd (74) *Attorney, Agent, or Firm* — Cesari and McKenna, LLP (57) ABSTRACT

A navigation system for use with moving vehicles includes target points proximate to a rendezvous site located on a first moving vehicle. One or more transmitters broadcast target point positioning information. A navigation unit on a second moving vehicle utilizes a camera to capture images that include the target points or a detector system that emits one or more beams to the target points. The navigation unit determines the relative position and orientation of the rendezvous site at the second vehicle. The navigation unit utilizes the relative position and orientation and an absolute position and orientation of the rendezvous site calculated from the target position information and calculates an absolute position and orientation corresponding to the second vehicle. The navigation unit then initializes its component inertial subsystem using a local position and orientation that are based on the calculated absolute position and orientation of the second vehicle.

23 Claims, 6 Drawing Sheets

(56) References Cited

U.S. PATENT DOCUMENTS

| | | |
|---|---|---|
| 7,193,559 B2 | 3/2007 | Ford et al. |
| 8,065,074 B1 | 11/2011 | Liccardo |
| 8,260,537 B2 | 9/2012 | Breed |
| 8,407,000 B2 | 3/2013 | Vos et al. |
| 2004/0006424 A1 | 1/2004 | Joyce et al. |
| 2007/0156338 A1 | 7/2007 | Coatantiec et al. |
| 2010/0228408 A1 | 9/2010 | Ford et al. |
| 2012/0059575 A1 | 3/2012 | Hartman et al. |
| 2012/0081248 A1 | 4/2012 | Kennedy et al. |
| 2012/0127030 A1 | 5/2012 | Arthur et al. |
| 2014/0070052 A1 | 3/2014 | Kang |
| 2014/0125812 A1 | 5/2014 | Morin |

NAVIGATION SYSTEM WITH RAPID GNSS AND INERTIAL INITIALIZATION

CROSS REFERENCE TO RELATED APPLICATIONS

The present application is a continuation-in-part of U.S. patent application Ser. No. 14/098,620, which was filed on Dec. 6, 2013, by Kristian Morin et al. for a NAVIGATION SYSTEM WITH RAPID GNSS AND INERTIAL INITIALIZATION and is hereby incorporated by reference.

BACKGROUND OF THE INVENTION

1. Field of the Invention

The invention relates generally to navigation systems and, more particularly, to navigation systems that incorporate inertial and GNSS subsystems.

2. Background Information

Inertial/GNSS receivers, such as the receivers described in U.S. Pat. Nos. 6,721,657 and 7,193,559, which are assigned to a common assignee and incorporated herein by reference, work well to provide accurate and uninterrupted navigation information, even in environments in which sufficient numbers of GNSS satellites are not continuously in view. As is described in the patents, the inertial/GNSS receivers utilize inertial measurements to fill-in whenever the GNSS subsystem does not receive GNSS satellite signals from a sufficient number of GNSS satellites to determine position. Further, the inertial/GNSS receivers combine, in real time, information from the GNSS and inertial subsystems to aid in signal re-acquisition and in the resolution of associated carrier ambiguities when a sufficient number of GNSS satellite signals are again available.

At start-up, the inertial/GNSS receivers must initialize the inertial and the GNSS subsystems before the inertial/GNSS receiver can operate in steady state navigation mode. The more quickly and accurately the inertial/GNSS receiver can complete the initialization, the faster the inertial/GNSS receivers can provide the accurate and uninterrupted navigation information to a user. Further, the inertial and GNSS subsystems must typically experience dynamic motion after or during start-up in order for the inertial/GNSS receivers to calculate the navigation information utilizing a combination of inertial measurements, GNSS observables, and GNSS position and covariance information.

We have developed a navigation system that speeds-up the initialization process for the inertial and GNSS subsystems without adversely affecting accuracy. Further, the navigation system enables the inertial and GNSS subsystems to utilize a combination of inertial measurements, GNSS and other observables, and GNSS position and covariance information to determine the navigation information after the initialization is complete, regardless of whether or not the inertial and GNSS subsystems have experienced dynamic motion.

SUMMARY OF THE INVENTION

A navigation system for use with moving vehicles includes a constellation of target points proximate to a rendezvous site located on a first moving vehicle. One or more transmitters associated with the target points broadcast or otherwise transmit target point positioning information, which includes the respective global positions of the target points. A navigation unit on a second moving vehicle utilizes a camera with known properties to capture an image that includes the constellation of target points. The navigation unit processes the image taken at a time that corresponds to the time tags, to identify the target points and determine the locations of the target points in the image, and from the locations determine the relative position and orientation of the rendezvous site at the second vehicle.

Alternatively, and instead of utilizing the camera, various detector systems may be utilized to essentially make an image of the rendezvous site. For example, a detector system may be based on a light sensor (e.g., Lidar system, a Kinect type system), an acoustical sensor (e.g., sonar system), an RF-type sensor (e.g., radar system), or an infrared sensor (e.g., infrared system). A detector system may aim one or more beams, such as visible light, sound, RF signals, or infrared signals, at the target points to identify the target points and determine how long it takes for the beam to bounce back or reflect from the rendezvous site to the detector system to determine relative distances from the targets. From the distances, the detector system determines the relative position and orientation of the rendezvous site at the second vehicle.

The navigation unit utilizes the relative position and orientation information and an absolute position and orientation of the rendezvous site calculated from the target position information to, in turn, calculate an absolute position and orientation corresponding to the second vehicle. The navigation unit then initializes its component inertial subsystem using a local position and orientation that is based on the calculated absolute position and orientation of the second vehicle.

The INS subsystem performs its initialization processes quickly using the calculated absolute position and orientation information corresponding to the second vehicle, without requiring the component GNSS subsystem to determine an initial position.

While the INS subsystem is initializing, the component GNSS subsystem utilizes the received target point positioning information to aid in the acquisition and tracking of GNSS satellite signals, thereby reducing the time to first fix.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
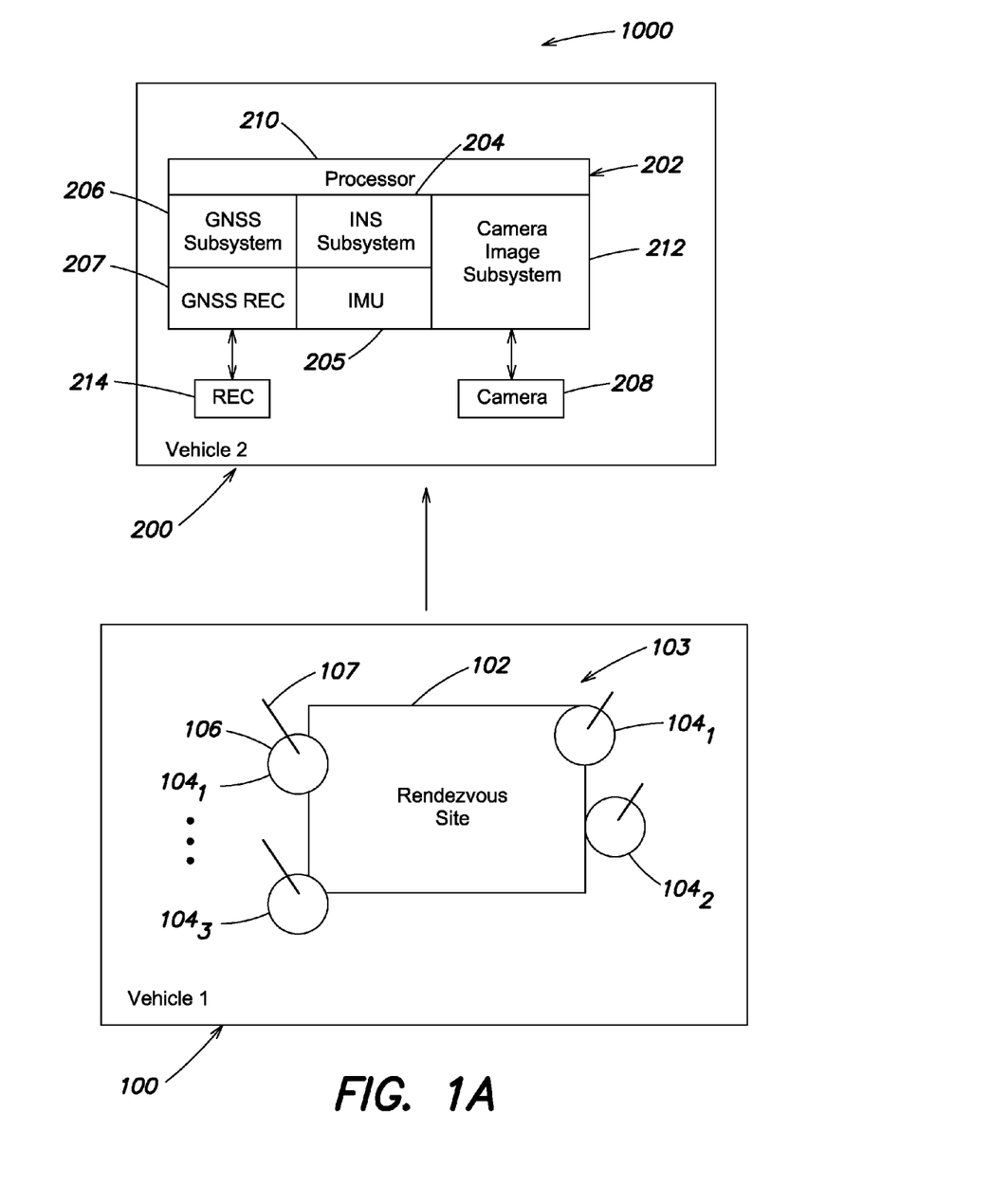
FIG. 1A is a functional block diagram of a navigation system constructed in accordance with the invention.

Referring now to FIG. 1A, a navigation system 1000 for use with moving vehicles includes a constellation 103 of target points $104_1, \ldots, 104_i$ that are strategically located proximate to a rendezvous site 102 on a first moving vehicle 100. The respective target points are discernible from their environment and from each other by, for example, their shapes, colors, designs, markings, barcodes, or other characteristic of the targets that are both individual to each target and discernible (detectable). In addition, the target points may include particular characteristics and/or properties, such as, but not limited to, the ability to reflect light, sound, RF, infrared, or other signals. The target points $104_1, \ldots, 104_i$ broadcast or otherwise transmit target point position information and are referred to herein collectively as "talking targets 104." The talking targets 104 may, for example, include GNSS receivers 106 and associated or constituent transmitters, or transceivers, GNSS antennas 107, and non-GNSS antennas (not shown) that broadcast or otherwise transmit the target point position information. In the example, the target point position information consists of respective target point identifiers, GNSS positions, and GNSS time tags. The talking targets 104 simultaneously broadcast the target point position information continuously or, as appropriate, at selected times.

The navigation system 1000 further includes a navigation unit 202 and an associated camera 208, with known properties, that operate on a second moving vehicle 200. The navigation unit 202 includes a GNSS subsystem 206, with a GNSS receiver and associated antenna 207, an inertial navigation (INS) subsystem 204 with an inertial measurement unit (IMU) 205, and a camera image subsystem 212, which processes the images taken by the camera 208. The respective subsystems operate under the control of a processor 210, which processes measurements, observables, and so forth, provided by the subsystems and produces navigation information that is provided to the user. The navigation unit 202 further includes a receiver 214 for receiving the target position information broadcast or transmitted by the talking targets 104.

As discussed in more detail below, the navigation unit utilizes the target position information received from the talking targets 104 and the relative position and orientation information derived from the camera images, to calculate the absolute position and orientation of the second vehicle, or more specifically the camera 208. For ease of explanation we refer to the calculated relative position and orientation determined using the camera images and the absolute position and orientation calculated using the relative values as "corresponding to the second vehicle."

The navigation unit provides the calculated position and orientation corresponding to the second vehicle as the local position and orientation, or attitude, for use during the initialization of the INS subsystem 204 and, in addition, may also provide the position information to the GNSS subsystem 206. Before providing the information to the INS and GNSS subsystems, the navigation unit translates the information to the locations of the IMU 205 and the GNSS antenna 207 based on known lever arms, or x, y, z separations, of the IMU and the GNSS antenna from the bore sight of the camera 208 and the known orientation of the camera relative to the IMU and the GNSS antenna, respectively, that is, the known angular misalignment between the camera and inertial reference frames and the camera and the GNSS reference frames.

The first and second moving vehicles 100 and 200 may be, for example, a ship and a helicopter; two ships; two automobiles, or any moving vehicles that may interact to, for example, come into contact with one another and/or operate in proximity to one another and avoid contact. The rendezvous site 102 may be a landing pad for the helicopter, or in the case of two ships or automobiles, the rendezvous site may be one or more designated areas on the front, back and/or side of a given ship or automobile. We discuss the navigation system below using as the example a ship as the first moving vehicle 100 and a helicopter as the second moving vehicle 200.

As soon as the second vehicle 200 separates, in the example, lifts off, from the rendezvous site 102, the camera 208 takes one or more images that include the talking targets 104 and provides the images to the camera image subsystem 212. The subsystem processes the image that is taken by the camera 208 at a time that corresponds to the time tag in the target position information received from the talking targets 104. Preferably, the images are, in the example, time tagged with GNSS time. Thus, the camera or subsystem may time tag the images with GNSS time provided by the GNSS subsystem 206 under the control of the processor 210 or with GNSS time provided by a battery-backed clock (not shown) that is synchronized to the GNSS time provided by the GNSS subsystem.

The camera image subsystem 212 processes the camera image to identify the talking targets 104 in the image by, for example, their shapes, individual colors, affixed patterns, and so forth. Based on the known properties of the camera, the camera image subsystem next determines positions of the talking targets 104 in the image. The subsystem further calculates the positions of the target points relative to the camera in a known manner, based on the associated scale.

The subsystem next calculates the relative position and orientation of the rendezvous site 102 with respect to, or at, the second vehicle 200 based on the calculated relative target positions. The subsystem then provides the calculated relative position and orientation information to the processor 210.

The processor 210 determines the absolute (ECEF) position and orientation of the rendezvous site 102 utilizing the target position information received from the talking targets 104. The processor next calculates the absolute position and orientation corresponding to the second vehicle, geometrically, based on the calculated absolute position and orientation of the rendezvous site and the calculated relative position and orientation of the rendezvous site determined from the camera image. The processor then provides the absolute position and orientation corresponding to the second vehicle to each of the INS and GNSS subsystems 204 and 206. As discussed in more detail below, the INS subsystem and, as appropriate, the GNSS subsystem use the calculated position and orientation information as well as other information derived from the camera images in initialization processes that occur simultaneously and are completed relatively quickly.

The initialization of the INS and the GNSS subsystems 204 and 206 using the target position information and the calculated absolute position and orientation corresponding to the second vehicle can be completed essentially as soon after lift-off as the camera image subsystem 212 can process the camera image to identify the talking targets 104 and determine the relative position and orientation of rendezvous site 102 at the second vehicle. The navigation unit 202 can then operate in steady state navigation mode using the IMU measurements, GNSS measurements, position and covariance, observables associated with the camera image, as well as the calculated absolute and relative position and orientation information corresponding to the second vehicle and, as appropriate, GNSS observables.

Figure 1B:
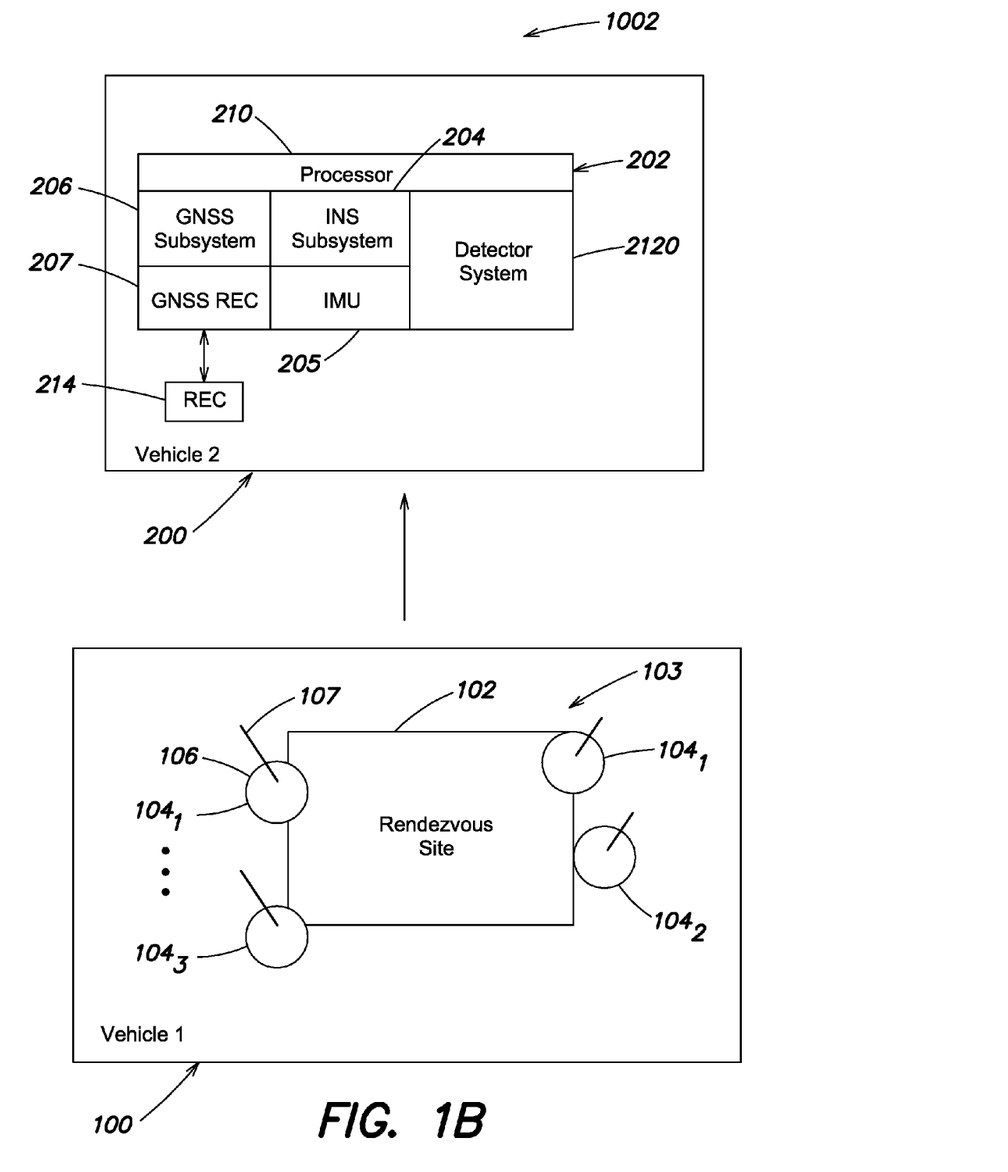
FIG. 1B is a functional block diagram of a navigation system constructed in accordance with the invention.

Alternatively, and with reference to FIG. 1B, system 1002 includes a detector system 2120, instead of the camera 208 and camera image subsystem 212, to essentially make an image of the rendezvous site. For example, the detector system 2120 may be based upon a light sensor (e.g., Lidar system, a Kinect type system), an acoustical sensor (e.g., sonar system), an RF-type sensor (e.g., radar system), or an infrared sensor (e.g., infrared system). The detector system 2120 also generates one or more beams, such as visible light, sound, RF signals, or infrared signals, which are aimed at the talking targets 104 to identify the talking targets 104. Detector system 2120 determines how long it takes for a beam to bounce back or reflect from the rendezvous site 102 to the detector system 2120 to determine relative distances from the targets 104. From the distances the detector system 2120 determines the relative position and orientation of the rendezvous site 102 at the second vehicle.

For example, if the detector system 2120 is a Lidar system that operates using visible light, the detector system 2120 records information associated with light reflected from "light" (e.g., white paint) and "dark" paint (e.g., black paint) or printed patterns, such as bar codes, that are affixed to respective talking targets 104 to identify each respective talking target 104 and to also determine the relative position and orientation of the rendezvous site 102 at the second vehicle. Specifically, the recorded information may be, but is not limited to, the time it takes the light to reflect back to the detector system 2120, and the angle at which the light is reflected back to the detector system 2120, to determine the distance between the detector system 2120 and each respective target 104.

Alternatively, if the detector system 2120 is a sonar system that operates using sound, the detector system 2120 records information associated with an acoustic wave reflected from different patterns or materials affixed to the respective talking targets 104 having different acoustic properties to identify each respective talking target 104 and to also determine the relative position and orientation of the rendezvous site 102 at the second vehicle. Specifically, the recorded information may be, but is not limited to, the time it takes the acoustic wave to reflect back to the detector system 2120, and the angle at which the acoustic wave is reflected back to the detector system 21020, to determine the distance between the detector system 2120 and each respective talking target 104.

If the detector system 2120 is a radar system, the detector system 2120 records information associated with an RF signal reflected from the respective talking targets 104 to identify each respective talking target 104 and to also determine the relative position and orientation of the rendezvous site 102 at the second vehicle. Specifically, the recorded information may be, but is not limited to, the time it takes the RF signal to reflect back to the detector system 2120, and the angle at which the RF signal is reflected back to the detector system 2120, to determine the distance between the detector system 2120 and each respective talking target 104.

If the detector system 2120 is an infrared system, the detector system 2120 records information associated with an infrared signal reflected from different patterns and/or material on the respective talking targets to identify each respective talking target 104 and to also determine the relative position and orientation of the rendezvous site 102 at the second vehicle. Specifically, the recorded information may be, but is not limited to, the time it takes the infrared signal to reflect back to the detector system 2120, and the angle at which the infrared signal is reflected back to the detector system 2120, to determine the distance between the detector system 2120 and each respective talking target 104.

Figure 2A:
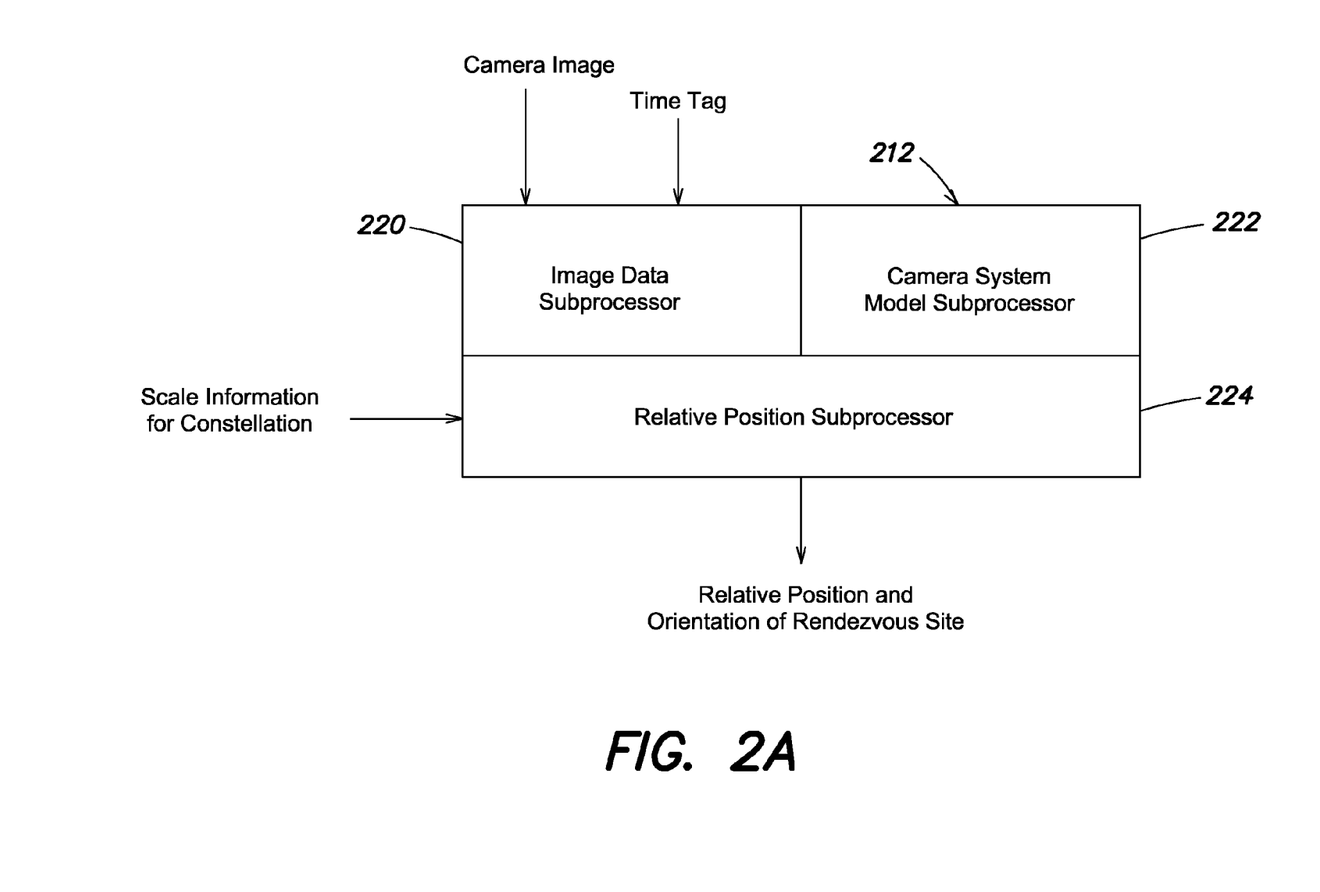
FIG. 2A is a functional block diagram of a camera image subsystem of FIG. 1A.

The navigation unit 202 then utilizes the relative position and orientation information and an absolute position and orientation of the rendezvous site 102 calculated from the target position information to, in turn, calculate an absolute position and orientation corresponding to the second vehicle, in a manner similar to that described above with reference to system 1000 of FIG. 1A. Referring now also to FIG. 2A, we discuss the operations of the camera image subsystem in more detail. The camera image subsystem 212 processes the camera images and identifies the respective talking targets 104 as pixel patterns in the image data based on the shapes, colors, designs and/or other characteristics of the target points that are discernable in the camera image data. The talking targets 104 may, for example, have different patterns painted on them, or patterned stickers affixed to them, such that the subsystem can identify the individual target points $104_1, \ldots, 104_i$ in the images. Once the respective target points are identified in the image, the camera image subsystem 212 operates in a known manner to determine the relative positions of the respective talking targets 104 based on the properties of the camera 208, that is, the focal point and lens distortion of the camera, and a known or provided scale associated with the constellation 103. Notably, the scale can be determined by the navigation unit 202 using the target position information received from the talking targets 104.

More specifically, to determine the relative positions of the target points, an image subprocessor 220 in the camera image subsystem first processes the image into image data, or pixels, and identifies the targets as particular patterns of pixels. A camera model subprocessor 222 uses an associated camera model that is based on the known focal point and lens distortion of the camera 208, to map the patterns of the pixels to corresponding x, y, z coordinates based on calculated incident angles with respect to a camera optical axis. The camera model subprocessor 222 may use as the model the well known pin-hole camera model, which maps the image data in a conventional manner to a model image plane. Alternatively, the subsystem may use a model that maps the image data to a model sphere, as described in co-pending patent application Ser. No. 13/669,987, entitled SPHERICAL PIN-HOLE MODEL FOR USE WITH CAMERA LENS IMAGE DATA, which is assigned to a common Assignee and is hereby incorporated herein by reference in its entirety.

From the mapping, the subprocessor calculates the relative positions of the targets identified in the image data using associated collinearity equations in a known manner. A position subprocessor 224 determines the relative position and orientation of the rendezvous site 102 corresponding to the second vehicle, that is, with respect to the camera 208, based on the calculated relative positions of the target points in the image and the known scale associated with the constellation 103.

The processor 210 uses the target position information received from the talking targets 104 to determine the absolute (ECEF) position and orientation of the rendezvous site 102. The processor then calculates the absolute position and orientation corresponding to the second vehicle geometrically, based on the calculated absolute position and orientation of the rendezvous site 102 and the calculated relative position and orientation of the rendezvous site that is derived from the camera image. The processor then translates the calculated absolute position and orientation corresponding to the second vehicle to a calculated position and orientation of the IMU based on the known relationships between the camera 208 and the IMU 205, that is, the lever arm and the orientation of the coordinate axes of the IMU with respect to the coordinate axes of the camera. The calculated absolute position and orientation corresponding to the IMU are thus known at the start of the INS initialization processes, i.e., before the GNSS subsystem is initialized.

The data from the IMU and the camera images are time tagged with the GNSS time at the navigation unit 202 and the target position information is time tagged at the talking targets, such that the respective subsystems can reliably interchange position-related information that is synchronized in time. The subsystems operate together, through software integration in the processor 210, to provide position-related information between the subsystems as predetermined times and/or in response to particular events.

The INS subsystem 204 and, as appropriate, the GNSS subsystem 206, use the calculated absolute position and orientation corresponding to the second vehicle, translated to the IMU position and orientation and the position of the GNSS antenna as the local positions and orientation. The INS subsystem 204 uses the calculated absolute position and orientation of the IMU and IMU measurement data to set up various matrices and an INS Kalman filter 203, as discussed below. The GNSS subsystem uses the target point positioning information and, as appropriate, the calculated absolute position of the GNSS antenna, to reduce the time to first fix, as also discussed below. The navigation unit 202 then operates the GNSS subsystem 206, the camera image subsystem 212, and the INS subsystem 204 in navigation mode under the control of the processor 210.

In steady state mode, the GNSS subsystem 206 processes the GNSS satellite signals received over an antenna 207 and operates in a known manner to make GNSS measurements, determine GNSS position and time and maintain position covariance values. As appropriate, the GNSS subsystem may also determine GNSS observables, such as accumulated Doppler range. At the same time, the camera image subsystem 212 processes the images taken by the camera 208 and determines the relative position and orientation from which the absolute position and orientation corresponding to the second vehicle are calculated. The camera image subsystem also determines associated observables of delta position and delta orientation derived from the changes in the relative position and orientation determined from camera images taken at different times.

The INS subsystem processes measurements received from the IMU 205, which reads data from orthogonally positioned accelerometers and gyroscopes (not shown). The INS subsystem incorporates the GNSS measurements, position and covariance and, as appropriate, GNSS observables, provided by the GNSS subsystem and the camera image related observables provided by the camera image subsystem in an INS Kalman filter that is used to process the INS measurements. INS-based position, velocity and attitude are then determined using a Kalman filter process and a mechanization process, as discussed below.

After processing, the navigation unit 202 provides navigation information, such as position, velocity and/or attitude, to the user through, for example, an attached display device (not shown). Alternatively, or in addition, the navigation unit may provide the navigation information to a vehicle steering mechanism (not shown) that controls the movements of the second vehicle.

Figure 2B:
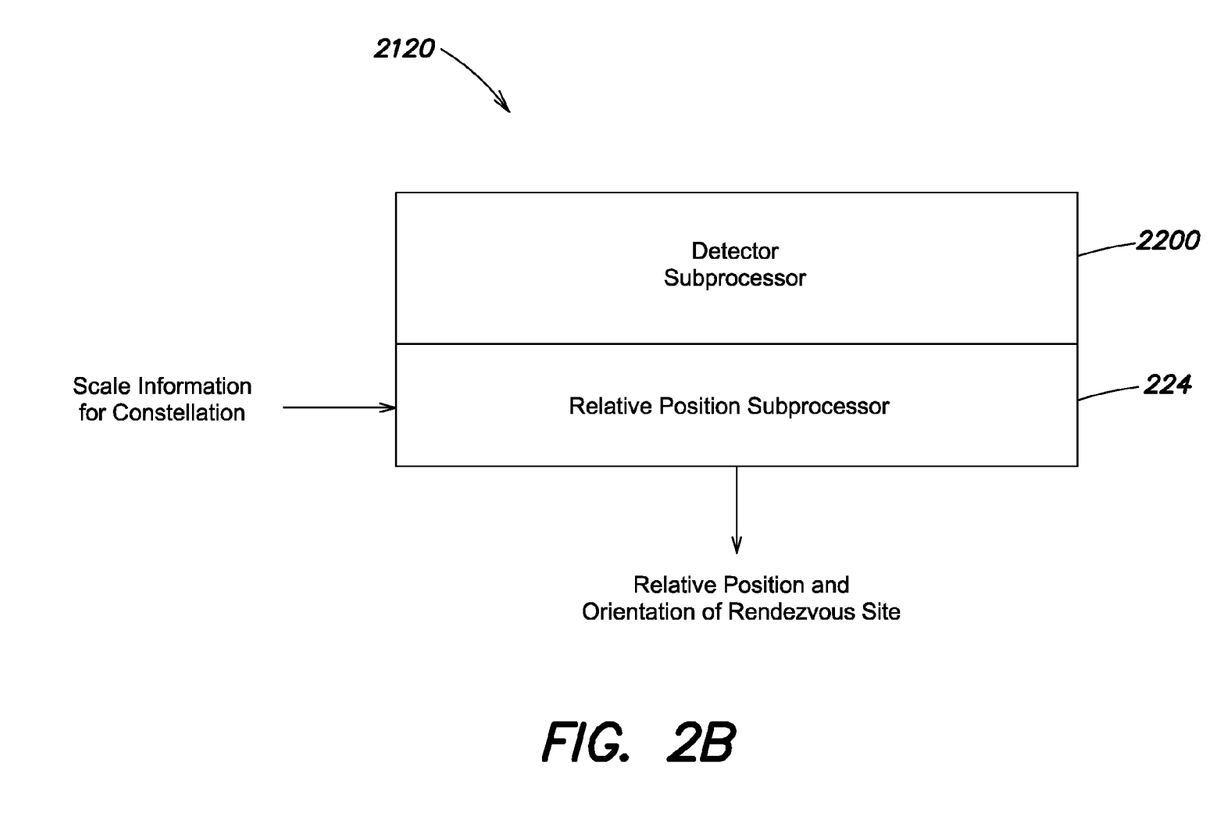
FIG. 2B is a functional block diagram of a detector system of FIG. 1B.

Referring now also to FIG. 2B, we discuss the operations of the detector system. The components of FIG. 2B operate in a manner similar to that of described above with reference to FIG. 2A, except that the camera 208 and camera image subsystem 212 are replaced with detector system 2120.

Specifically, and based on the rate at which an emitted beam travels along with the angle of return and the time it takes for a beam to reflect back to the detector system 2120 from each respective talking target (e.g., distance=rate*time), the detector subprocessor 2200 can determine the distance between the respective talking targets and the detector system 2120, as known by those skilled in the art.

The relative position subprocessor 224 of FIG. 2B operates in a similar manner to that described above with reference to FIG. 2A to determine the relative position and orientation of the rendezvous site 102 corresponding to the second vehicle, that is, with respect to the detection system 2120, based on the calculated relative positions of the identified talking targets 104, as described above.

The navigation unit 202 (FIG. 1B) and its corresponding components utilize the relative position and orientation information and an absolute position and orientation of the rendezvous site 102 calculated from the target position information to, in turn, calculate an absolute position and orientation corresponding to the second vehicle in a similar manner as described above with reference to FIG. 2A, but utilizing the detector system 2120 instead of the camera 208 and camera image subsystem 212. The navigation unit 202 then initializes its component inertial subsystem using a local position and orientation that is based on the calculated absolute position and orientation of the second vehicle.

The INS subsystem 204 performs its initialization processes, as described above with reference to FIG. 2A, quickly using the calculated absolute position and orientation information corresponding to the second vehicle, without requiring the component GNSS subsystem 206 to determine an initial position.

Figure 3:
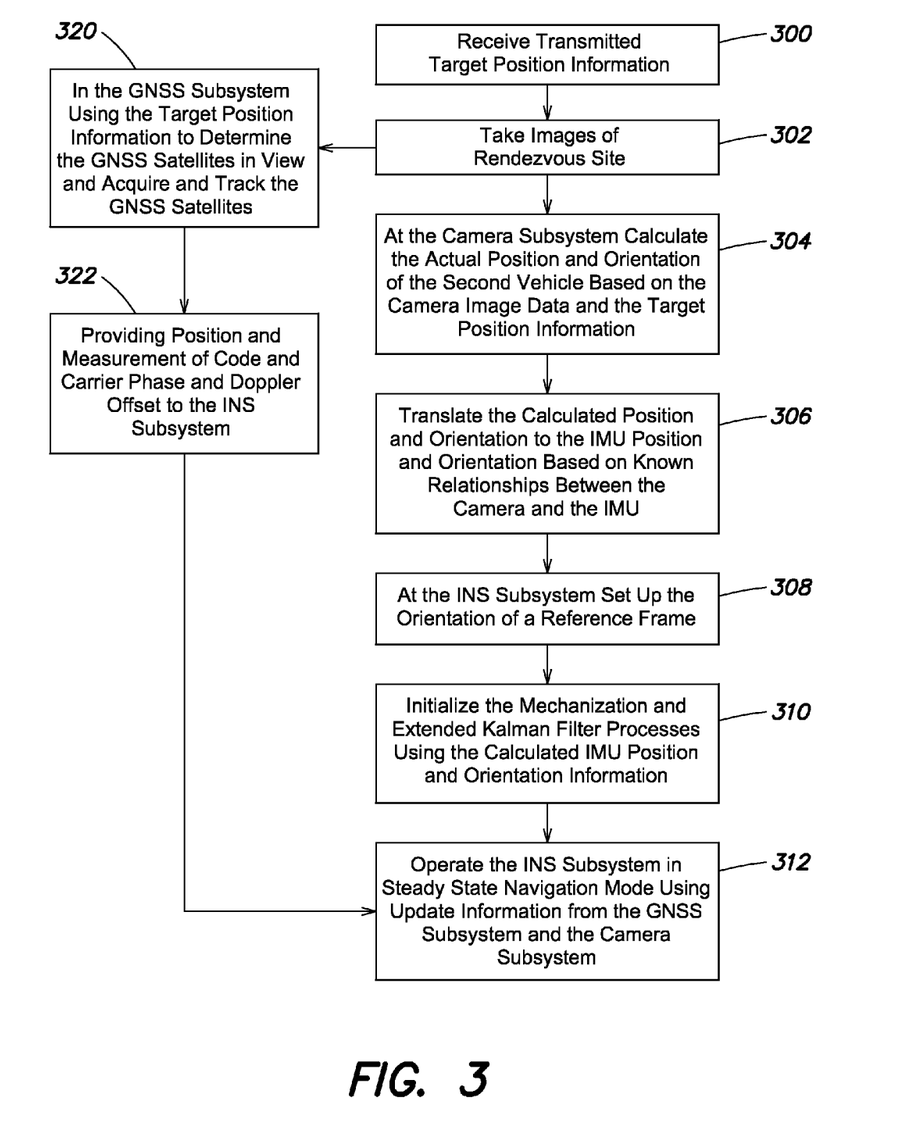
FIG. 3 is a flow chart of initialization operations performed by the navigation system of FIG. 1A.

Referring now also to FIG. 3, we discuss the operations of the navigation unit 202 to initialize the INS and GNSS subsystems in more detail. For ease of understanding, we discuss the processing operations of the navigation unit subsystems without specific reference to the processor 210. The system may instead include dedicated GNSS, INS, and camera image sub-processors that communicate with one another at appropriate times to exchange information that is required to perform the various GNSS, INS and camera image calculation operations discussed below. For example, the INS sub-processor and the camera image sub-processor communicate with the GNSS sub-processor when IMU data and, as appropriate, camera image data are provided to the respective sub-processors, in order to time-tag the data with GNSS time. Further, the GNSS sub-processor communicates with the INS sub-processor to provide the GNSS observables and GNSS measurements, position and covariance at the start of each measurement interval, and so forth.

At start up, the navigation unit 202 receives the target position information from the rendezvous site 102 and the camera 208 takes images of the rendezvous site, at steps 300 and 302, respectively. The target position information is provided to the camera subsystem 212 and may also be provided to the GNSS subsystem 206.

In step 304, the camera subsystem 212 processes the camera image that has the same time tag as the target position information, and calculates the relative position and orientation of the rendezvous site 102 at the second vehicle 200, e.g., relative to the camera 208, based on the locations of the talking targets 104 in the camera image, a known or calculated scale, and the known characteristics of the camera as discussed above with reference to FIG. 2A. The navigation unit 202 further calculates the absolute position and orientation of the rendezvous site 102 geometrically, using the target position information received from the talking targets 104.

For example, the navigation unit determines the absolute (ECEF) three dimensional position of a center point of the rendezvous site and the orientation of x, y and z coordinate axes based on the transmitted positions of the respective target points. The navigation unit then calculates the absolute (ECEF) position and orientation corresponding to the second vehicle, based on the calculated absolute and relative positions and orientations of the rendezvous site.

The navigation unit 202 translates the calculated position and orientation information corresponding to the second vehicle to the position and orientation of the IMU 205 based on the known relationships between the camera 208 and the IMU 205 (Step 306). The known relationships are a lever arm, that is, a 3-dimensional vector representing the separation of the IMU from the camera bore sight, and the orientation of the IMU coordinate axes with respect to the coordinate axes of the camera. As appropriate, the navigation unit also provides the calculated position information to the GNSS subsystem, after translating the information to correspond to the location of the GNSS antenna 207, based on corresponding predetermined lever arm values. The GNSS subsystem may, in turn, provide associated position covariance information to the INS subsystem based on the calculated and, as appropriate, translated absolute position.

In Step 308, the INS subsystem 204 sets up the orientation of a reference, or body, frame for the IMU accelerometer and gyroscope measurements. The INS subsystem uses as the initial position and attitude the calculated and translated absolute position and orientation of the IMU. Thereafter, in Step 310, the INS subsystem initializes mechanization and Kalman filter processes using the calculated and translated position and orientation information as the local position and orientation or attitude. The INS subsystem may thus start its initialization process while the GNSS subsystem 206 is determining its initial GNSS position. This is in contrast to known prior systems, in which the INS subsystem instead must wait to set up the matrices and the mechanization and the INS Kalman filter processes until the associated GNSS subsystem provides the initial position.

While the INS subsystem 204 is setting up the reference frame, the GNSS subsystem 206 uses the received target position information to aid in the acquisition and tracking of GNSS satellite signals. (Step 320). The GNSS subsystem may, for example, acquire signals from satellites known to be visible from the positions of the talking targets. Alternatively, or in addition, the GNSS subsystem may utilized the calculated absolute position corresponding to the second vehicle to aid in the satellite signal acquisition by, for example, presetting the locally generated codes based on signal travel times from the respective satellites to the calculated position, and so forth, all in a known manner. The GNSS subsystem thus takes a relatively short time to achieve its first fix and provide a GNSS position, as well as measurements of code and carrier phases and Doppler offset to the INS subsystem for use during steady state operations. (Step 322) In Step 312, the INS subsystem operates in steady state mode, regardless of the amount and type of movement of the second vehicle.

To produce the navigation information, the navigation unit 202 performs two main processes, the mechanization of the raw IMU data into a trajectory (a time series of position, velocity and attitude) and the correction of that trajectory with updates estimated by the GNSS/INS integration process, which is an extended Kalman filter. The Kalman filter used for the INS integration contains state variables representing the errors of the system being modeled, which are position, velocity, attitude, IMU sensor errors, and optionally the offset vectors (or lever arms) from the IMU to GNSS antenna and IMU to camera. The mechanization occurs at the rate of the IMU data (typically velocity and angular increments) at a relatively high rate, usually higher than 100 Hz. The Kalman filter runs at a lower rate, for example at 1 Hz, such that errors in the INS trajectory accumulate to become clearly observable when compared to the update information provided by the GNSS subsystem and, when available, the update information provided by the camera subsystem. Further, the lower rate tends to keep the updates sufficiently separated in time to eliminate (or at least mitigate) time correlated errors on the update measurements.

To initialize the mechanization process, starting point values for attitude, position and velocity are required. The position must be supplied from a source that is external to the IMU. The velocity can either be supplied from an external source, or assumed to be zero based on analysis of the raw accelerometer and gyroscope measurements. The attitude may also be supplied from an external source, here the camera subsystem, or depending on the quality of the IMU sensors, the attitude can be solved for using an analytical coarse alignment where the measured acceleration and angular rotation values are used with knowledge of the earth's rotation direction and magnitude and the earth's gravity vector and the position of the IMU, to compute the rotations between the IMU body frame and the local level frame or the ECEF frame. During the analytical coarse alignment, however, the IMU must remain stationary, typically for at least one minute. Thus, the inclusion of the camera subsystem to supply the initial attitude avoids the requirement to remain stationary.

As discussed, the subsystem provides the absolute calculated and translated attitude, which is derived from one or more images of the target points, the absolute coordinates of those target points, the known relationship between the camera frame and the IMU frame, and the associated camera model. Accordingly, during initialization the second vehicle may be moving without adversely affecting the initialization. Further, the use of the calculated and translated absolute attitude allows the subsystem to determination, as an angular solution derived the image, values for gyroscope biases. In addition, the camera image based attitude updates "observe" the INS attitude errors directly, allowing the Kalman filter to separate the IMU sensor errors, i.e., the gyroscope bias and an accelerometer bias, from the INS attitude errors. Accordingly, the IMU sensor errors can be determined without requiring the IMU to undergo dynamic motion. Thus, the IMU sensor errors can be determined, in the example, when the second vehicle is slowly moving with respect to, or hovering above, the first vehicle after lift-off.

From the initial position, velocity and attitude values, the mechanization process integrates the raw gyroscope and accelerometer measurements into a position, velocity and attitude time series. This trajectory is the system for which errors are estimated by the extended Kalman filter.

The extended Kalman filter also requires initialization. The Kalman filter is based on a state space model that defines the relationships between the states with a first order differential equation.

$$\dot{x} = Fx + Gw$$

where F is the dynamics matrix that defines the differential equation relating the states to the their time derivative, w is the noise associated with the process, and G is a matrix that acts as a shaping filter to distribute the noise across the states.

The solution to this set of differential equations in the discrete domain is:

$$x_k = \Phi_{k,k-1} x_{k-1} + w_k$$

where $\Phi_{k,k-1} = e^{F \Delta t}$, which is typically approximated in a first order linearization as $\Phi_{k,k-1} \cong I + F \Delta t$, $W_k$ is the noise associated with the state space model, and $\Phi$ is the transition matrix that defines the interactions between the states in the discrete Kalman filter processes. Because of the relationships between states, directly observing one state allows the filter to estimate other states that are not directly observed but have a linkage to the directly observed error state.

To begin the Kalman filter process, initial variances are required for each state, to form the state covariance matrix P. The initial variances for the Kalman filter states are the same as the variances of the initial values for position, velocity and attitude used in the mechanization process, and the expected magnitude of the IMU sensor errors. Process noise values, which are indicative of uncertainties in the state space model, are also required to start the Kalman filter process.

The Kalman filter is propagated between update measurements. Thus, the values for the states and their variances are propagated forward in time based on how they are known to behave as defined in the transition matrix. When an update measurement is available, the states can be observed and the observations are then utilized to update the gain and covariance matrices and P and the state vector x.

Basically, the update measurement is an external measure of the state values, while the Kalman filter propagation provides the assumed state values based on the model. The update measurement does not need to directly observe states. It can indirectly observe states if a model can be made to combine the states into the domain of the measurement:

$$z_k = H_k x_k,$$

where z is a function of the states and H is the design matrix. The variable $\hat{z}_k$ used in the update is the absolute measurement made, while $z_k$ the value computed by the observation model and the current state estimates $x_k$.

The Kalman filter process is defined by propagation equations:

$$P_k^- = \Phi_{k,k-1} P^- \Phi_{k,k-1}^T + Q_k$$

$$x_k^- = \Phi_{k,k-1} x_{k-1}^+$$

where Q is a matrix that represents the time propagation of the spectral densities of the state elements, and update equations:

$$K_k = P_k^- H_k^T [H_k P_k^- H_k^T + R_k]^{-1}$$

$$\hat{x}_k^+ = \hat{x}_k^- + K_k(\hat{z}_k - H_k \hat{x}_k^-)$$

$$P_k^+ = [I - K_k H_k] P_k^-$$

where $R_k$ is the measurement variance matrix for the absolute measurements and K is the gain matrix.

The propagation step can happen as often as the user would like updated state and variance estimates based on the state space model. The update step can happen whenever an external aiding measurement is available. In an INS integration filter it is typical to run the propagation step to precede the update step, because the mechanization process is providing the full system values (i.e. position, velocity, and attitude) at a high rate (i.e. >100 Hz) allowing the errors described in the Kalman filter's state vector to accumulate. The errors are thus well observed in the update measurement, which happens at a lower rate (i.e. 1 Hz). After every update, the estimated state vector is used to correct the mechanized trajectory (and update IMU sensor error estimates), and then set to zero, because once the error estimates have been applied to the trajectory, all known error has been removed from the system.

In the update process, the gain matrix, K, is formed as a combination of the design matrix, H, the state variance matrix P, and the update measurement variance matrix R. The design matrix defines how the states are combined to create the observation equation, and this determines the observability of the states through the update. The state and measurement variance matrices control how much a state can be corrected by the update, that is, they control the overall gains for each state. For example, if the measurement has a much larger variance than the state variance, even if the design matrix indicates that the measurement has strong observability, the correction to the states will be minimized, via a small gain value, because the filter knowledge of the state is stronger than the measurement. As different update measurements are applied in the filter, with different design matrices and varying measurement qualities, the Kalman filter state estimates begin to converge. This convergence is indicated in the state variance matrix, P, as it is updated with the gain matrix and design matrix of the update measurements.

While the Kalman filter provides estimates of the state immediately upon initialization, the variance of those states will remain large until they are observed through updating, which essentially validates or corrects the state values predicted by the state space model. If a state is not well observed through the update process, the Kalman filter cannot produce a high quality (low variance) estimate of it, and this will result in larger propagated variances for any other state that has the poorly observed state as a constituent, which will make the filter more likely to allow low quality measurement updates to strongly correct the state estimates. For the Kalman filter to be stable, all of its states should be well observed with variances of equivalent magnitudes. This also provides the user of the overall navigation system with good quality trajectory estimates. Additionally, good quality, low variance estimates of the states minimizes the errors in the mechanized trajectory, so that longer periods between update measurements can be better tolerated—that is the error in the INS trajectory will be less over a given integration time if the IMU sensor error estimates are accurate.

In the navigation system 202, the update measurements are position measurements derived from the GNSS signals, and may also include the GNSS raw measurements like pseudo-ranges, carrier phases and Doppler velocity measurements, and position and/or attitude values derived by the camera subsystem from images including the talking targets and/or from images including other identifiable features, as discussed above.

The difference between the GNSS position and INS position and/or the camera subsystem position and attitude and the INS position and attitude are considered as direct observations of the position and attitude error state variables. Further, because the state space model defines the position error as the integral of the velocity error, a position update also observes the velocity error states. The state space model defines the velocity errors as a combination of accelerometer errors, attitude errors as they manifest as incorrect removal of gravity accelerations from each accelerometer axis, errors in the assumed gravity value, as well as position and velocity errors as they manifest in the incorrect removal of earth's rotation effects from the accelerometer measurements.

A position update to the Kalman filter provides a very indirect measurement of the attitude errors. When available, the attitude values derived by the camera subsystem allow for a direct observation of the attitude error state, and over repeated update epochs, the variance of the attitude errors states will decrease much more rapidly than it would have with only position updates, or other update measurements whose observation equations are in the position or velocity domain only. Accordingly, using the attitude information based on the camera images, the INS subsystem can relatively quickly determine altitude error states with low variances.

The current subsystem thus utilizes the calculated and translated position and attitude values provided by the camera subsystem 212, based on images of the talking targets and the transmitted target positioning information, to initialize the INS mechanization process and the extended Kalman filter integration process with accurate position and attitude values when the second vehicle is in motion relative to the first vehicle. Thereafter, the current system utilizes the calculated and translated position and/or attitude values provided by the camera subsystem, based on images containing the talking targets and/or other identifiable features in the images, as well as position information from the GNSS subsystem to update the INS integration process, that is, the extended Kalman filter. The use of the position and attitude information provided by the camera subsystem as the local position and attitude allows the navigation system to operate in steady state navigation mode essentially at start-up, before the GNSS subsystem is initialized, and without requiring the IMU to either remain stationary to perform an analytical coarse alignment, or experience motion with position updates made available to observe and separate the gyroscope errors, attitude errors and accelerometer errors. As discussed, the GNSS subsystem may also utilize the local position information to reduce the time to first fix such that the GNSS subsystem can supply updated position and attitude for the steady state operations.

In contrast to the IMU sensors 24 and 26, the camera 208 does not have to move dynamically to provide images from which accurate changes in position and orientation information and associated IMU element biases can be estimated. Accordingly, filter and mechanization process can accurately determine updated INS-position, attitude and velocity with or without dynamic motion, and the navigation unit can therefore operate accurately in a steady state mode while, in the example, the second vehicle is hovering.

The camera image associated observables based on changes in the calculated relative positions and orientation, that is, delta position and delta orientation, are available as long as there are uniquely identifiable features that appear in multiple images. Also, as long as the talking targets 104 are in the field of view of the camera and the target position information is received by the navigation unit 202, the calculated absolute position and orientation corresponding to the second vehicle is available as an observable for use in the Kalman filter process as well.

Once the two vehicles move sufficiently far apart such that talking the targets 104 are no longer the field of view of the camera 208, the calculated absolute position and orientation information corresponding to the second vehicle is no longer available to the Kalman filter process. Similarly, if uniquely identifiable features are not discernible in multiple camera images, the associated camera image related position and orientation observables are not available. The navigation unit continues to perform the Kalman filter and mechanization processes, using all of the available position related information, with the propagated covariance matrix reflecting that no camera image derived information is available.

If GNSS position is also not then available from the GNSS subsystem, e.g., if the GNSS receiver and antenna 207 does not receive signals from a sufficient number of satellites, and the second vehicle is moving, the INS Kalman filter does not perform an update. The propagated covariance matrix then reflects that no GNSS and/or camera related position is available. The inertial position, which is based on the inertial measurements and the available GNSS observables, is then used as the navigation unit position at the start of the next one second measurement cycle. If, however, the second vehicle is stationary when the GNSS position and camera related position information is not available, the navigation unit saves the state of the system and the INS Kalman filter and operates in a known manner to perform a zero velocity update, also referred to as a ZUPT in the incorporated patents, and the navigation unit 202 then uses the interpolated inertial position as the navigation unit position at the start of the next measurement cycle.

The mechanization process combines the initial conditions determined during alignment with the IMU data, to keep the INS sub-system parameters current. Thereafter, the mechanization process uses the conditions associated with the ending boundary of the previous IMU measurement interval, and propagates the INS sub-system parameters, that is, current position, velocity and attitude, from the end boundary of the previous IMU measurement interval to the end boundary of the current IMU measurement interval.

For the INS processing, the IMU 205 provides the inertial measurements to the INS subsystem 204 and also produces a pulse that coincides with the first byte of the information. The pulse interrupts the processor 210, which provides the GNSS time from a GNSS clock (not shown) to the INS subsystem. The INS subsystem, in turn, time tags the inertial measurements with the GNSS time. The inertial position based on the measurement data is thus time synchronized to a GNSS position. A similar arrangement occurs to time tag the camera image data, such that position information based on the camera image is time synchronized to a GNSS position.

The navigation unit 202 may also utilize target position information and the camera images to navigate toward or away from the second vehicle 200 instead of or in addition to the position information determined by the GNSS subsystem 206. In the example, the helicopter takes advantage of the more robust navigation equipment aboard the ship.

We have described the talking targets 104 as each including a transmitter that broadcasts or transmits target position information. The system may instead include WIFI transmitters at the respective talking targets and/or utilize a single transmitter and networked talking targets 104. The talking target positions may be determined by other than GNSS receivers at the respective talking targets. For example, the positions of the talking targets may be known relative to a GNSS receiver (not shown) on the first vehicle, such that the respective positions of talking targets at the first vehicle can be calculated from the GNSS position of the vehicle. The processor 210 may consist of one or more processors, the respective subsystems of the navigation unit may be combined or separated into additional subsystems, the camera 208 may but need not be included in the navigation unit. As discussed, the GNSS observable of accumulated Doppler range may but need not be included in the INS Kalman filter. The INS Kalman filter operates in a known manner, for example, as described in the incorporated U.S. Pat. Nos. 6,721,657 and 7,193,559, as modified to include camera image related observables.

In addition, the talking targets 104, which are located proximate to the rendezvous site 102, may be arranged as a constellation 103 of any non-linear shape. The talking targets 104 may remain in place proximate to the rendezvous site. Alternatively, the talking targets 104 may be removed sometime after the second vehicle 200 separates from the first vehicle, and replaced before an expected approach of the second or another vehicle. Further, since the talking targets 104 are distinguishable from one another and transmit or broadcast their respective target positions, the talking targets 104 need not be replaced in the same positions and/or arranged in the same constellation shape. For ease of image processing, the constellation 103 preferably consists of at least four talking targets 104.

To calculate a direct, or linear, solution information from four talking targets are used. If the constellation 103 includes more than four talking targets, the navigation unit may utilize the camera images that include at least four of the talking targets, even if all of the target points are not visible in the respective camera images. To calculate a non-linear solution, which involves an estimation of the position and orientation of the second vehicle, for example, based on a previously calculated position and orientation and the movement of the vehicle, three-dimensional information provided by two talking targets and at least height information from an additional talking target may be used in the calculations. Accordingly, the navigation unit may utilize the camera images that include only three talking targets for the non-linear solution calculations.

Figure 4:
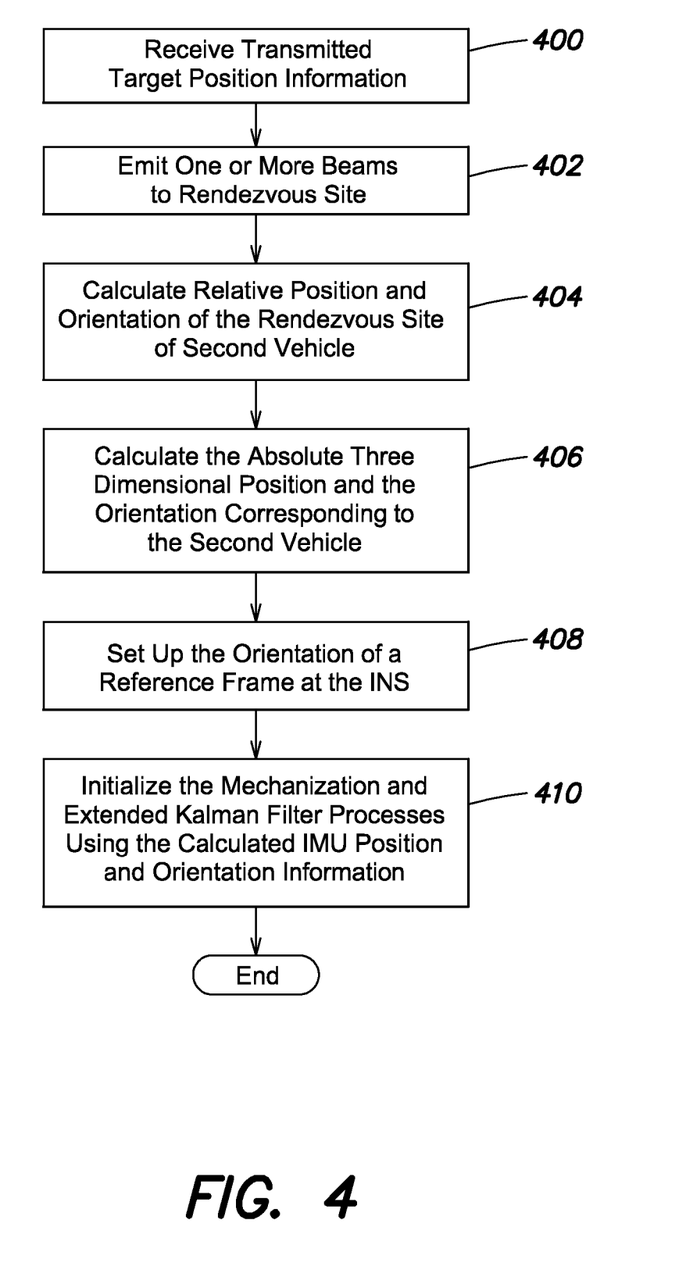
FIG. 4 is a flow chart of initialization operations performed by the navigation system of FIG. 1B.

Referring now also to FIG. 4, we discuss the operations of the navigation unit 202 to initialize the INS and GNSS subsystems in more detail. For ease of understanding, we discuss the processing operations of the navigation unit subsystems without specific reference to the processor 210. The system may instead include dedicated GNSS, INS, and detector processor or subprocessors that communicate with one another at appropriate times to exchange information that is required to perform the various GNSS, INS and distance calculation operations discussed. For example, the INS subprocessor and the detection system subprocessor communicate with the GNSS subprocessor when IMU data and, as appropriate, detection system data are provided to the respective subprocessors, in order to time-tag the data with GNSS time. Further, the GNSS subprocessor communicates with the INS subprocessor to provide the GNSS observables and GNSS measurements, position and covariance at the start of each measurement interval, and so forth.

At start up, the navigation unit 202 receives the target position information from the rendezvous site 102 and the detection system 2120 emits one or more beams to the rendezvous site 102 which reflected back to the detection system 2120, at steps 400 and 402, respectively. It is noted that the target position information is provided to the detection system 2120 and may also be provided to the GNSS subsystem 206.

In step 404, the detection system 2120 processes and calculates the relative position and orientation of the rendezvous site 102 at the second vehicle 200, e.g., relative to the detection system 2120, based on the rate at which the beam travels, along with the angle of return and the time it takes for the beam to reflect back to the detector system 2120 from each respective talking target 104, as discussed above with reference to FIG. 2B. Specifically, the detection system 2120 identifies the respective talking targets 104 and determines the relative position and orientation of the rendezvous site 102 geometrically, using distances between the detection system 2120 and the talking targets 104.

In step 406, the navigation unit then calculates the absolute (ECEF) position and orientation corresponding to the second vehicle, based on the calculated relative positions and orientations of the rendezvous site 102 and the transmitted position information of the respective talking targets 104. For example, the navigation unit 202 determines the absolute (ECEF) three dimensional position of a center point of the rendezvous site and the orientation of x, y and z coordinate axes based on the transmitted positions of the respective talking targets.

In step 408, the INS subsystem 204 sets up the orientation of a reference, or body, frame for the IMU accelerometer and gyroscope measurements. The INS subsystem uses as the initial position and attitude the calculated and translated absolute position and orientation of the IMU. Thereafter, in Step 410, the INS subsystem initializes mechanization and Kalman filter processes using the calculated and translated position and orientation information as the local position and orientation or attitude. The INS subsystem may thus start its initialization process while the GNSS subsystem 206 is determining its initial GNSS position. This is in contrast to known prior systems, in which the INS subsystem instead must wait to set up the matrices and the mechanization and the INS Kalman filter processes until the associated GNSS subsystem provides the initial position. Following step 410, the procedure ends.

What is claimed is:

1. An inertial/global navigation satellite system (GNSS) navigation system comprising:
   on a first moving vehicle
     a constellation of target points proximate to a rendezvous site;
     one or more transmitters that transmit target position information corresponding to the respective target points;
   on a second moving vehicle
     a detector system;
     a receiver that receives the transmitted target position information; and
     a navigation unit including
       a detector subprocessor that determines calculated relative positions and orientations of the target points based on distance information indicating a distance between the detection system and each respective target point determined utilizing one or more beams emitted by the detector system,
       a GNSS subsystem including a GNSS receiver,
       an inertial navigation (INS) subsystem including an inertial measurement unit, and
       one or more processors configured to calculate an absolute position and orientation corresponding to the second vehicle based on the calculated relative position of the rendezvous site and the received target position information, the one or more processors providing the calculated absolute position and orientation corresponding to the second vehicle to at least the INS subsystem;
     the INS subsystem determining a local position and orientation for use in an initialization process based on the calculated absolute position and orientation corresponding to the second vehicle.

2. The inertial/GNSS navigation system of claim 1, wherein the detector system includes a light sensor that emits a beam of light that reflects from each respective target.

3. The inertial/GNSS navigation system of claim 2, wherein the detector subprocessor determines the distance based on at least one of a rate of travel of the beam of light, an angle of reflection of the beam of light, and a time it takes for the beam of light to reflect back to the detector system.

4. The inertial/GNSS navigation system of claim 1, wherein the detector system includes an acoustical sensor that emits an acoustical wave that reflects from each respective target.

5. The inertial/GNSS navigation system of claim 4, wherein the detector subprocessor determines the distance based on at least one of a rate of travel of the acoustical wave, an angle of reflection of the acoustical wave, and a time it takes for the acoustical wave to reflect back to the detector system.

6. The inertial/GNSS navigation system of claim 1, wherein the detector system includes an RF sensor that emits an RF signal that reflects from each respective target.

7. The inertial/GNSS navigation system of claim 6, wherein the detector subprocessor determines the distance based on at least one of a rate of travel of the RF signal, an angle of reflection of the RF signal, and a time it takes for the RF signal to reflect back to the detector system.

8. The inertial/GNSS navigation system of claim 1, wherein the detector system includes an infrared sensor that emits an infrared signal that reflects from each respective target.

9. The inertial/GNSS navigation system of claim 8, wherein the detector subprocessor determines the distance based on at least one of a rate of travel of the infrared signal, an angle of reflection of the infrared signal, and a time it takes for the infrared signal to reflect back to the detector system.

10. The inertial/GNSS navigation system of claim 1, wherein the GNSS subsystem uses the received target position information to aid in initialization.

11. The inertial/GNSS navigation system of claim 1, wherein the target points are distinguishable from one and other by one or more of shape, patterns, or markings.

12. The inertial/GNSS navigation system of claim 1, wherein the target position information for a given target point includes a global position, a target point identifier, and a time tag.

13. The inertial/GNSS navigation system of claim 1 wherein the constellation consists of at least four target points.

14. The inertial/GNSS navigation system of claim 1 wherein the navigation unit provides navigation information to a steering device on the second vehicle.

15. A method comprising:
  transmitting, by one or more transmitters on a first vehicle, target position information corresponding to each respective target point of a constellation of target points proximate to a rendezvous site on a first moving vehicle;
  receiving, by a receiver on a second vehicle, the transmitted target information;
  determining, by a detector system on the second vehicle, calculated relative positions and orientations of the target points based on distance information indicating a distance between the detection system and each respective target point determined utilizing one or more beams emitted by the detector system;
  calculating, by one or more processors on the second vehicle, an absolute position and orientation corresponding to the second vehicle based on the calculated relative position of the rendezvous site and the received target position information; and
  providing, by the one or more processors, the calculated absolute position and orientation corresponding to the second vehicle to at least an inertial navigation (INS) subsystem on the second vehicle, where the INS subsystem utilizes the calculated absolute position and orientation corresponding to the second vehicle to determine a local position and orientation for use in an initialization process.

16. The method of claim 15, wherein the detector system includes a light sensor that emits a beam of light that reflects from each respective target.

17. The method of claim 16, wherein the detector system determines the distance based on at least one of a rate of travel of the beam of light, an angle of reflection of the beam of light, and a time it takes for the beam of light to reflect back to the detector system.

18. The method of claim 15, wherein the detector system includes an acoustical sensor that emits an acoustical wave that reflects from each respective target.

19. The method of claim 18, wherein the detector system determines the distance based on at least one of a rate of travel of the acoustical wave, an angle of reflection of the acoustical wave, and a time it takes for the acoustical wave to reflect back to the detector system.

20. The method of claim 15, wherein the detector system includes an RF sensor that emits an RF signal that reflects from each respective target.

21. The method of claim 20, wherein the detector system determines the distance based on at least one of a rate of travel of the RF signal, an angle of reflection of the RF signal, and a time it takes for the RF signal to reflect back to the detector system.

22. The method of claim 15, wherein the detector system includes an infrared sensor that emits an infrared signal that reflects from each respective target.

23. The method of claim 22, wherein the detector subprocessor determines the distance based on at least one of a rate of travel of the infrared signal, an angle of reflection of the infrared signal, and a time it takes for the infrared signal to reflect back to the detector system.

* * * * *